United States Patent [19]

Rayburn

[11] 4,089,037
[45] May 9, 1978

[54] PLEATED METALLIZED FILM CAPACITORS

[75] Inventor: Charles C. Rayburn, Mt. Prospect, Ill.

[73] Assignee: Illinois Tool Works Inc., Chicago, Ill.

[21] Appl. No.: 818,628

[22] Filed: Jul. 25, 1977

[51] Int. Cl.² ............................................. H01G 1/01
[52] U.S. Cl. ....................................... 361/305; 361/304
[58] Field of Search ................. 361/304, 305, 308, 309

[56] References Cited

U.S. PATENT DOCUMENTS

| | | | |
|---|---|---|---|
| 1,886,997 | 11/1932 | Wilkins | 361/305 |
| 3,256,588 | 6/1966 | Sikina | 361/305 X |
| 3,303,550 | 2/1967 | Banzhoe | 361/308 X |

Primary Examiner—E. A. Goldberg
Attorney, Agent, or Firm—Glenn W. Bowen; Robert W. Beart

[57] ABSTRACT

Improved electrical capacitors are formed utilizing a thin dielectric layer which is metallized with an aluminum layer and a protective layer of metal, such as lead, tin or zinc, which does not readily oxidize in air is deposited on the aluminum layer. Capacitors of this type are formed by pleating, or folding, the dielectric layer so that one portion of an electrode is brought into contact with or adjacent to another portion of the same or of the opposite electrode. The protective layer prevents conversion of the aluminum layer between the adjacent electrode areas to insulating aluminum oxide, which could otherwise occur during the application of a high voltage pulse during testing or use of the capacitor.

6 Claims, 6 Drawing Figures

PLEATED METALLIZED FILM CAPACITORS

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sided metallized dielectric layer is folded an odd number of times in a longitudinal direction. The folded dielectric material may then be wound along its longitudinal dimension and end terminations may then be applied to it by spraying of metal against the edges of the wound capacitor segment. The type of capacitor described by McMahon patent is extremely desirable because substantially all of the dielectric layer of the capacitor is in the electric field and the capacitor may be made without the insertion of an additional dielectric layer in the main body of the capacitor, although a short initial unmetallized dielectric strip and a protective terminating dielectric strip may be employed with the capacitor, if desired.

The type of capacitor construction that is envisioned by McMahon patent has a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field. Shorter winding lengths per unit capacitance are thereby required, reducing the winding labor. The dielectric lengths can also be calibrated and pre-cut to produce a capacitor of more accurate values. Another advantage of this type of capacitor is that there are no air layers between the metallized electrodes and the pleated film surfaces and this substantially increases the voltage, for example, one hundred volts or more, at which corona discharge starts, making this capacitor commercially attractive for new applications such as fluorescent lighting circuits. Previously, fifty gauge film thickness or more was required of wound film capacitors to withstand the corona. With the capacitor of the present invention, thirty-two gauge or less dielectric film thickness may be utilized, making wound film capacitors economically feasible for such applications.

The conventional metal electrode layer that is secured to the dielectric layer is aluminum. It has now been discovered that when one portion of an electrode is brought into contact with an adjacent portion of the same electrode there is a danger that the very thin aluminum oxide layer that occurs naturally on the aluminum electrode area can be augmented due to arcing when a high voltage pulse is applied to the electrode during test or use of the capacitor. When this occurs, the electrode area between the two adjacent electrode portions may be converted entirely to oxide, thereby opening one, or both, sections of the electrode with a consequent loss of capacitance and an increase in the probability of dielectric damage due to corona in A.C. applications. The present invention eliminates this problem by plating a very thin conductive layer of a metal that has a relatively low melting point to prevent dielectric degrading, is less readily oxidizable than aluminum and does not react adversely with the dielectric layer, on the aluminum layer before the aluminum oxide layer can form. The aluminum layer is generally on the order of 240 angstroms thick with a natural oxide layer of approximately 10 angstroms thick. Plating thickness of the protective layer is preferably at least 10 angstroms. The protective layer should be formed with a metal having an evaporation rate high enough to allow good plating economics. Moreover, the metal should have a relatively low heat of fusion, heat of vaporization and vaporization temperature. Metals that may be used for the protective layer are lead, tin and zinc, although other metals and alloys may be employed.

While the present invention is described by reference to a particular embodiment, it is apparent that the invention is useful for all types of metallized dielectric capacitors having dielectric layers that are metallized with aluminum wherein two electrode layers are adjacent each other. Examples of some capacitors which may utilize the present invention are described in copending applications Ser. No. 814,958 filed July 12, 1977, "Pleated Metallized Film Capacitor with Sprayed Edge Terminations"; Ser. No. 814,945 filed July 12, 1977, "Single Pleat Metallized Film Capacitor with Sprayed Edge Terminations"; Ser. No. 814,955 filed July 12, 1977, "Pleated Metallized Film Capacitor with Staggered Edges"; and Ser. No. 814,954 filed July 12, 1977, "Pleated Metallized Film Capacitor Wound About Its Center", all of which have been invented by the inventor of the present invention and all of which are assigned to the assignee of the present invention.

DESCRIPTION OF THE DRAWINGS

The present invention is illustrated by reference to the drawings in which.

TECHNICAL DESCRIPTION OF THE INVENTION

Figure 1:
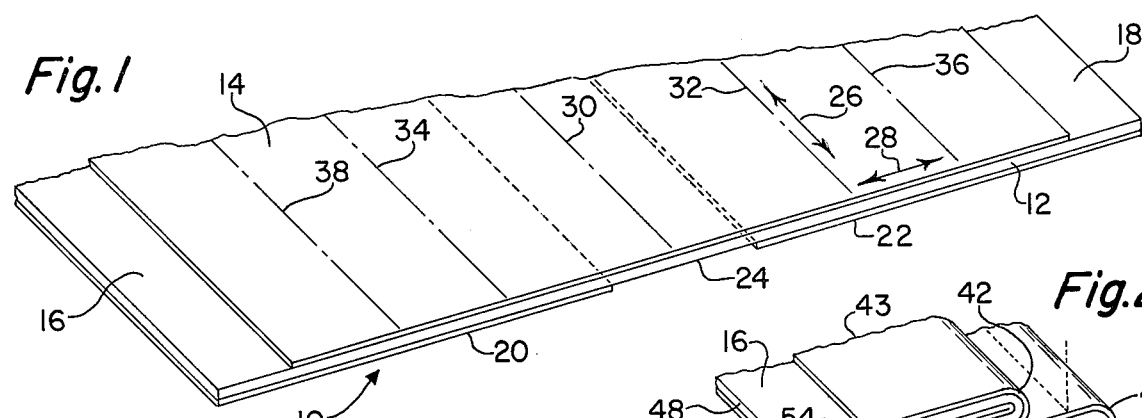
FIG. 1 is a perspective view of a portion of a metallized dielectric layer which may be used in the construction of the capacitor that utilizes the present invention.

A portion of a metallized dielectric strip which may be unwound from a reel, that is suitable for a making of a capacitor that utilizes the present invention is shown in FIG. 1. The metallized dielectric strip is formed with a dielectric layer 12 of a thin film dielectric material, such as polyester, polypropylene, polystyrene, polycarbonate or other suitable material. A thin metallized aluminum electrode layer 14 is applied directly to the upper surface of the dielectric layer 12 in such a fashion that unmetallized margin areas 16, 18 extend along the longitudinal edges of the strip 10. Two thin metallized electrode areas of aluminum 20, 22 are also applied directly to the lower surface of the dielectric layer 12 so that the metallized layer 20 extends to the left hand margin of the layer as shown in FIG. 1, while the metallized layer 22 extends to the right hand margin of the layer. A central unmetallized strip 24 lies between the metallized electrode areas 20, 22. A thin layer 90 of a low melting point metal, such as lead, tin or zinc, which does not readily oxidize in air is deposited over the electrode areas 14, 20 and 22. The aluminum layers 14, 20 and 22 are generally on the order of 240 angstroms thick and the layer 90 is preferably at least 10 angstroms thick. The layer 90 is preferably formed in the same vacuum chamber that is used to deposit the aluminum layer so as to prevent the aluminum oxide layer 90', which would otherwise build up, from occurring. With the protective layer 90, arcing due to the application of a high voltage testing pulse to the electrode 20 will not cause conversion of the aluminum electrode to oxide, as it would without this layer. The consequent loss of capacitor value and the development of corona in A.C. applications is thereby eliminated, as otherwise would occur in area 91.

Figure 2:
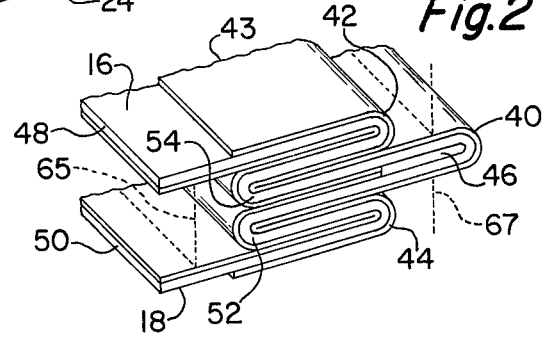
FIG. 2 is a perspective view of a fully pleated capacitor layer in accordance with the dielectric layer of FIG. 1.

In the embodiment shown in FIG. 1, the longitudinal dimension of the metallized strip 10 is shown along the arrows 26 while the narrow transverse dimension is shown along the arrows 28. The capacitor is pleated along the imaginary line 30 which extends through the length of the unmetallized central strip 24. A suitable capacitor could also be formed by pleating along transverse lines if the appropriate corresponding metallized and unmetallized areas were provided A pleated capacitor is shown in FIG. 2, wherein one pleat occurs along the longitudinal center line 30 and other pleats occur along the longitudinal pleat lines 32, 34, 36 and 38. It is to be noted that lines 32, 34, 36 and 38 are spaced so that the center pleat 40 extends beyond the other pleats 42, 44 that run along the right hand longitudinal edge of the metallized strip 10 of FIG. 1 so that the inside of the pleat 40 in the area 46 is unmetallized. The extension of the center pleat 40 beyond the pleats 42, 44 is preferably at least 0.020 inches. In addition, it is noted that the pleats are positioned so that the longitudinal ends 48, 50 of the metallized strip 10 are aligned with each other but so that they extend beyond the pleats 52, 54 that run along the left hand longitudinal edge of the metallized strip. Again, the extension of the ends 48, 50 beyond the pleats 52, 54 is preferably at least 0.020 inches. The unmetallized margin 16, therefore, faces upwardly while the unmetallized margin 18 faces downwardly when the capacitor segment has been fully pleated as shown in FIG. 2.

After the capacitor has been processed to form the capacitor segment shown in FIG. 2, a number of different additional processing steps may be undertaken. For example, the pleated capacitor segment of FIG. 2 could be used to form a capacitor merely by spraying the right and left hand longitudinal edges of the segment with a metallized spray, such as babbitt or other suitable metal, in accordance with conventional practice, and then electrical leads could be secured to them, for example, by soldering. Alternately, the capacitor segment of FIG. 2 could be cut along a transverse line, such as the line 43, and a number of such segments could be stacked upon each other, and then their ends could be sprayed with a metallized spray and leads could then be secured to the stacked array of such segments. Another version of a capacitor could be achieved, however, by pleating the capacitor segment of FIG. 2 a number of times transversely along transverse fold lines such as the line 43, or alternately pleating several times, and then completing the segment by winding the remainder of the length of the dielectric strip.

Figure 4:
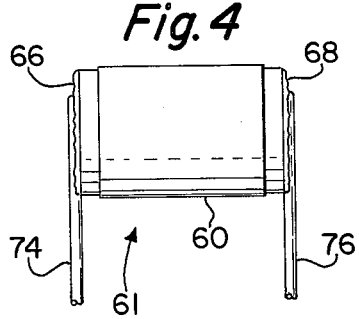
FIG. 4 is a side view of a completed capacitor following attachment of radial leads.
Figure 3:
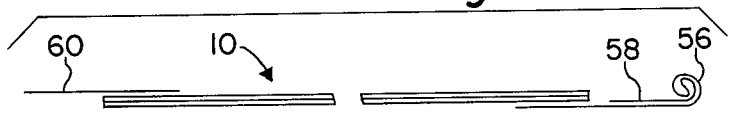
FIG. 3 is a diagrammatic showing of the winding of a capacitor segment in accordance with the construction of FIG. 2.
Figure 5:
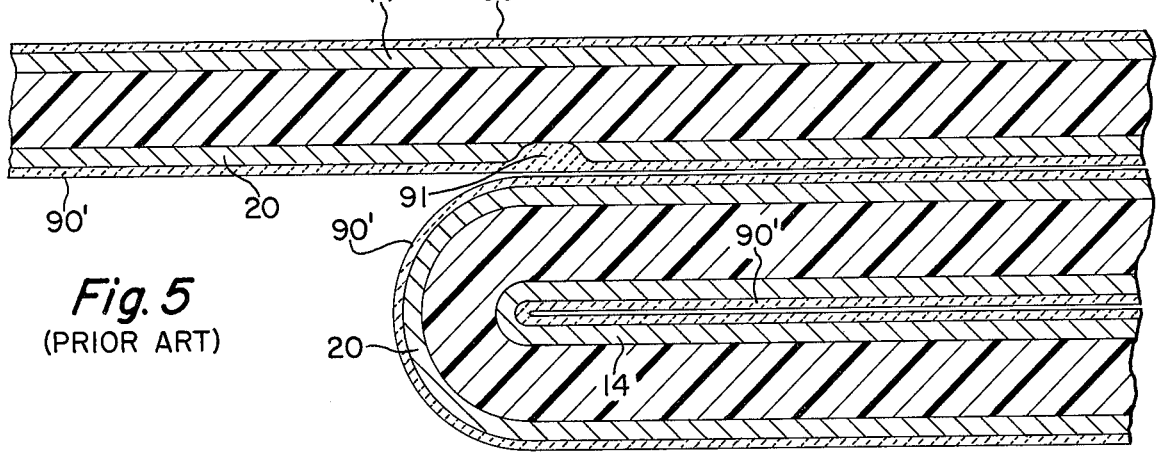
FIG. 5 is an enlarged cross section view of two adjacent electrode areas of FIG. 2 with electrode failure without use of the present invention.
Figure 6:
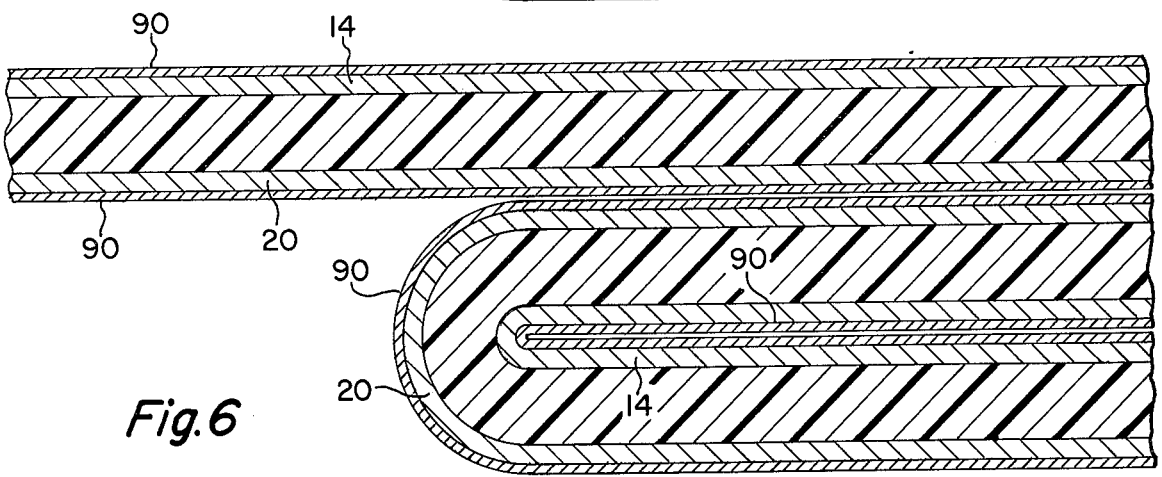
FIG. 6 is an enlarged cross-sectional view of two adjacent electrode areas of FIG. 2 without electrode failure when the present invention is employed.

The winding of the capacitor segment of FIG. 2 into a wound capacitor may be achieved with various winding techniques, including the use of a removable split mandrel such as the mandrel 56 of FIG. 3. An unmetallized dielectric strip 58 is desirably initially wound around the mandrel to protect the metallized electrode areas of the metallized strip 10. Near the completion of winding, an additional unmetallized dielectric strip 60 is desirably wound into the structure to form an outer protective coating. The dielectric strip 60 may also be heat-sealed to itself to form the pleated capacitor segment 61 which is shown in FIG. 4. The removal of the mandrel 56 from the capacitor segment 61 leaves an opening in the unit. The opening may be closed by applying pressure, or pressure and heat, in accordance with the type of dielectric used and conventional manufacturing techniques, to the capacitor segment 61 so that it assumes an oval shape.

Once the capacitor segment of the embodiment of FIGS. 2 and 3 has been wound, a metallized spray may then be directed against the longitudinal edges of the unit in accordance with conventional processing techniques to interconnect the electrode layers along these edges and to provide for the connection of electrical leads to the unit. The metallized spray will penetrate into the open area between the ends 48 and 50 on the left hand longitudinal edge of the capacitor segment, as shown diagrammatically in FIG. 2 to a depth such as that indicated by the plane 65. The plane 65 indicates the maximum depth that any high velocity spray particles will penetrate and it may thus be located any place between the ends 48 and 50 of the metallized strip 10 and the edges of the pleats 52, 54. Accordingly, the metallized spray material will extend into the left hand opening of the capacitor between the ends 48, 50 far enough to make contact to the two facing metallized electrode areas 20, 22, but not so far that it will penetrate through the dielectric material at the pleats 52, 54. The configuration of this illustrated capacitor thus provides for reliable lead termination at the left hand longitudinal edge of the capacitor segment of FIG. 2 without the necessity of providing unmetallized longitudinal strips along the inside of the pleats 52, 54, thereby saving considerable processing expenses in the manufacture of completed capacitors of this type.

Termination to the right hand longitudinal edge of the capacitor segment of FIG. 2 is similarly provided by a metallized spray which extends over the protruding center pleat 40 to a depth, such as that indicated by the plane 67, which is sufficient to allow the metallized spray to make good contact to the electrode area 14, but which will prevent the penetration of the spray metallic particles through the dielectric at the pleats 42, 44. The location of the plane 68 may be anywhere between the edges of the pleats 42, 44 and the edge of the pleat 40 as long as there is sufficient depth of spray to provide adequate contact termination to the electrode area 14. A considerable cost savings is achieved by the illustrated capacitor since the pleats 42, 44 like the pleats 52, 54, did not have to be provided with their own unmetallized strips. It will be noted in this capacitor that only one unmetallized strip 24 is required in the center of the metallized strip 10, and, thus, the same general pattern may be used for various pleat configurations and a separate individually configurated metallized strip is not required for each pleat pattern. Once the metallic spray has been applied to the edges of the capacitor segment of FIG. 4, the leads 74, 76 may be applied to it by soldering, arc-welding or other conventional lead attachment methods.

The previously described capacitor embodiment utilizing the present invention is illustrative only since the invention is useful to provide stable, corona-free capacitors whenever capacitors utilize dielectric strips having electrode areas that are formed with metallized aluminum and are constructed so that portions of the electrode areas are positioned adjacent each other in the completed capacitor.

What is claimed is:

1. In an electrical capacitor comprising a dielectric layer having at least one pleat therein, a first metallized aluminum electrode area on said dielectric layer and a second metallized aluminum electrode area on said dielectric layer positioned adjacent said first electrode area at a number of locations determined by the number of said pleats, the improvement comprising a protective layer over substantially all of said aluminum layer of said first and second electrode areas which is formed of a metal which is oxidized in air to a much smaller degree than is aluminum.

2. The improvement of claim 1, wherein said protective layer is at least 10 angstroms thick.

3. The improvement of claim 2 wherein said protective layer is formed of lead that is deposited on said aluminum layer in the same vacuum that is used to deposit said aluminum layer on said dielectric layer.

4. The improvement of claim 2 wherein said protective layer is formed of tin that is deposited on said aluminum layer in the same vacuum that is used to deposit said aluminum layer on said dielectric layer.

5. The improvement of claim 2 wherein said protective layer is formed of zinc that is deposited on said aluminum layer in the same vacuum that is used to deposit said aluminum layer on said dielectric layer.

6. In an electrical capacitor comprising a dielectric layer having at least one pleat therein, a first metallized aluminum electrode area on said dielectric layer and a second metallized aluminum electrode area on said dielectric layer positioned adjacent said first electrode area at a number of locations determined by the number of said pleats, the improvement comprising a protective layer over substantially all of said aluminum layer of said first and second electrode areas which is formed of a metal which is oxidized in air to a much smaller degree than is aluminum, and is of the class consisting of lead, tin and zinc.

* * * * *